(12) United States Patent
Zengerle et al.

(10) Patent No.: US 8,585,792 B2
(45) Date of Patent: Nov. 19, 2013

(54) FILTER FOR USE IN A GAS GENERATOR

(75) Inventors: Werner Zengerle, Regensburg (DE); Simon Schreiber, Wasserburg am Inn (DE); Karsten Schwuchow, Wasserburg am Inn (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 696 days.

(21) Appl. No.: 12/011,542

(22) Filed: Jan. 28, 2008

(65) Prior Publication Data

US 2008/0264022 A1 Oct. 30, 2008

(30) Foreign Application Priority Data

Feb. 5, 2007 (DE) .......................... 10 2007 005 588

(51) Int. Cl.
*B01D 46/00* (2006.01)
(52) U.S. Cl.
USPC ............ 55/385.3; 55/525; 242/360; 280/736; 280/740; 29/896.62; 422/167
(58) Field of Classification Search
USPC .................. 96/421; 55/385.3, 495, 522, 527, 55/DIG. 5, 520, 525–526, DIG. 45; 280/728.1–743.1; 148/14; 141/14–17, 141/59, 98; 166/227–236; 422/164–167; 102/530–531, 282, 430, 202, 102/202.5–202.14, 204; 264/DIG. 48; 222/3, 5; 242/360–363
See application file for complete search history.

(56) References Cited

U.S. PATENT DOCUMENTS

| 4,012,211 | A | * | 3/1977 | Goetz ............................. 55/485 |
| 4,322,385 | A | * | 3/1982 | Goetz ............................ 422/165 |
| 5,087,070 | A | | 2/1992 | O'Loughlin et al. |
| 5,308,370 | A | * | 5/1994 | Kraft et al. ...................... 55/487 |
| 5,407,120 | A | * | 4/1995 | Philpot ......................... 228/155 |
| 5,471,932 | A | * | 12/1995 | Kraft et al. ..................... 102/531 |
| 5,551,724 | A | * | 9/1996 | Armstrong et al. ........... 280/737 |
| 5,660,606 | A | * | 8/1997 | Adamini ......................... 55/337 |
| 5,665,131 | A | * | 9/1997 | Hock et al. ...................... 55/487 |
| 5,673,483 | A | * | 10/1997 | Hock et al. ................. 29/896.62 |
| 5,845,934 | A | * | 12/1998 | Armstrong, III .............. 280/742 |
| 5,908,481 | A | * | 6/1999 | Siddiqui ......................... 55/485 |
| 6,095,559 | A | | 8/2000 | Smith et al. |
| 6,840,977 | B1 | * | 1/2005 | Fukunaga et al. .............. 55/526 |
| 7,192,055 | B2 | * | 3/2007 | Stevens et al. ................ 280/741 |
| 7,275,760 | B2 | * | 10/2007 | Quioc et al. ................... 280/736 |
| 7,630,806 | B2 | * | 12/2009 | Breed ............................. 701/45 |
| 7,640,663 | B2 | * | 1/2010 | Hirata et al. ................ 29/896.62 |
| 7,823,919 | B2 | * | 11/2010 | Jackson et al. ................ 280/736 |
| 2004/0150201 | A1 | * | 8/2004 | Furusawa et al. ............. 280/736 |
| 2007/0193235 | A1 | * | 8/2007 | Hirata ............................. 55/487 |
| 2007/0210567 | A1 | * | 9/2007 | Krupp et al. .................. 280/736 |
| 2009/0295132 | A1 | * | 12/2009 | Jackson et al. ................ 280/736 |

FOREIGN PATENT DOCUMENTS

| DE | 3742383 | 6/1989 |
| DE | 4141906 | 7/1992 |

(Continued)

*Primary Examiner* — Duane Smith
*Assistant Examiner* — Thomas McKenzie
(74) *Attorney, Agent, or Firm* — Tarolli, Sundheim, Covell & Tummino LLP

(57) ABSTRACT

A filter for use in a gas generator of a safety arrangement in vehicles, has several layers of a woven metal fabric consisting of metal wires which are woven together. The woven metal fabric is preferably calendered, wound to form a roll, and pressed to form said filter.

19 Claims, 8 Drawing Sheets

(56) References Cited

FOREIGN PATENT DOCUMENTS

| DE | 4201741 | 7/1993 |
| DE | 69927384 | 2/2000 |
| DE | 60015155 | 1/2001 |
| DE | 102004032609 | 2/2006 |
| EP | 0370734 | 5/1990 |
| EP | 370734 B1 * | 2/1995 |
| WO | 2006023474 | 3/2006 |

* cited by examiner

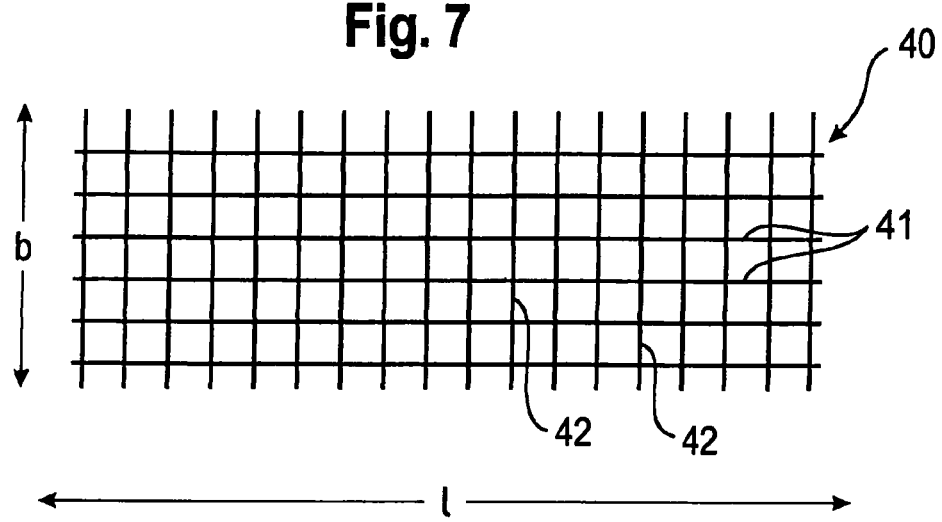
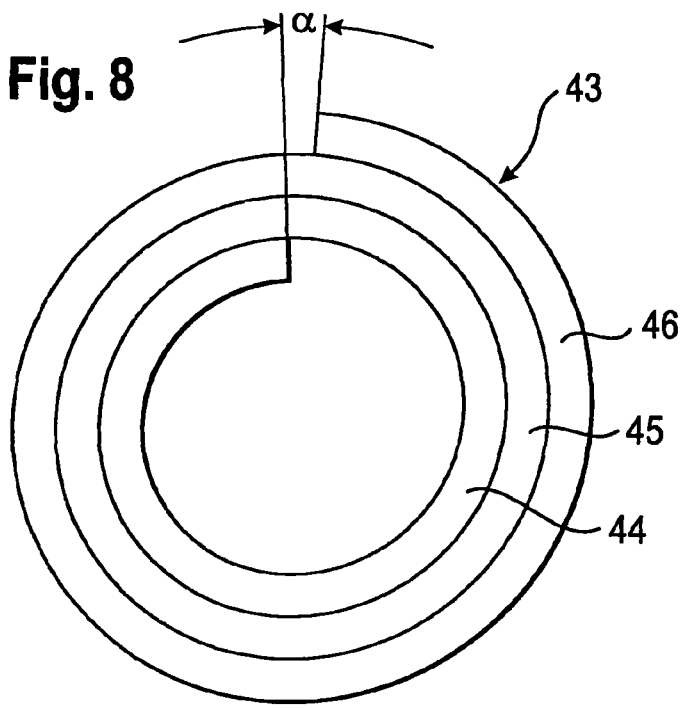

FILTER FOR USE IN A GAS GENERATOR

TECHNICAL FIELD OF THE INVENTION

The invention relates to a filter adapted for use in a gas generator of a safety device in vehicles, a gas generator containing the filter, a method for the production of the filter and the use of the filter in a gas generator for a vehicle occupant restraint system.

BACKGROUND OF THE INVENTION

Filter- and cooling elements for gas generators in airbag systems are known from DE 10 2004 032 609 A1, which are constructed in several layers with a plurality of metallic individual elements and have a plurality of passage openings, provided in or between the individual elements, for a fluid medium. These filters are intended to serve as an alternative to conventional metallic filters in gas generators, which consist of a knitted mesh pressed into shape. For the knitted mesh filters, a metal wire is processed into knitted fabrics or socks by knitting machines and is then pressed into the respectively desired shape, for example a hollow cylinder. However, the knitted mesh filters which are produced in this way have a non-homogeneous distribution of the pore volume. Moreover, in the conventional knitted mesh filters the formation of defects can frequently be observed, where a characteristic pore volume, predetermined by the loop radius a and the mesh width, is distinctly exceeded and cavities, tears or splits occur which are visible to the naked eye.

Thus, it is an object of the present invention to provide favourably priced alternatives to filters made of pressed knitted metal wire, which are adapted for use in a gas generator for cooling the gas stream and for separating residues of propellant and larger particles of propellant.

SUMMARY OF THE INVENTION

According to the invention a filter adapted for use in a gas generator of safety arrangement in vehicles is comprised of a multi-layered woven metal fabric, said woven metal fabric consisting of metal wires which are woven together, and the woven metal fabric being wound to form a roll, and pressed.

The use of a woven metal fabric as the starting material for the production of the filter leads to a largely homogeneous distribution of the pore volume without larger closed cavities or gaps being able to be observed, because the periodic spatial structure of the woven fabric is maintained after the woven fabric is wound to form a roll and after pressing to form the filter. Through a suitable selection of the blank fabric, pressing force, press matrix, type of woven fabric and material of the woven fabric, in addition the pressing density can be set systematically.

According to a preferred embodiment, the woven metal fabric is rolled tightly in a calender. Through the calendering or tight rolling of the woven metal fabric, the individual metal wires are fixed in the woven fabric, so that the wires can no longer move in relation to each other. The subsequent pressing of the woven fabric, which is wound to several layers, results in large-area strukturen being pushed together, with the homogeneity originating from the periodic structure of the woven metal fabric being retained in the filter. Moreover, the calendering of the woven metal fabric enables adjacent fabric layers to move easier towards each other and therefore moving together more easily into a greater packing density during pressing. Due to the woven fabric structure of the filter material, the stability of the shape of the pressed filter is substantially improved.

The filter made from calendered woven metal fabrics therefore has a more homogeneous distribution of the pore volume and a lower susceptibility to the formation of faults compared with the filters produced from conventional knitted wire fabrics. The filtering effect is therefore improved substantially, so that basically smaller filters can be used, which require less structural space. As conventional press matrices can be used, a favourably priced manufacture of the filter according to the invention is also guaranteed.

In a preferred embodiment of the filter according to the invention, the metal wires have a wire diameter of approximately 0.4 mm to 1.5 mm. The mesh width of the woven metal fabric can be approximately double the wire diameter. Depending on the selected wire diameter, the mesh width preferably lies in a range from between approximately 0.8 to 4 mm. With a filter which is constructed in such a way, a good cooling effect is achieved for the emerging gas stream and also a reliable separation of hot particles and other residues of the propellant.

Various types of weave can be used for the woven metal fabric, i.e. intersections of warp and weft wires. The woven metal fabric preferably has a basket weave or one of the known twill weaves.

The present invention further provides a gas generator for use in a safety arrangement for vehicles, comprising a combustion chamber which contains a propellant for generating a hot gas, and a filter associated with the combustion chamber for cooling and cleaning the gas of solid particles. According to the invention, the filter is formed from several layers, preferably more than five layers, of a woven metal fabric consisting of metal wires which are woven together, the woven metal fabric being wound to form a roll, and pressed. The woven metal fabric is preferably calendered.

Moreover, the invention provides a method for the production of a filter for use in a gas generator for a safety arrangement in vehicles, which comprises the following steps:
 providing a blank from a woven metal fabric;
 winding the blank of the woven metal fabric to form a roll of a multi-layered woven metal fabric;
 pressing the roll of the multi-layered woven metal fabric, thereby forming the filter.

According to a particularly preferred embodiment, the blank of the woven metal fabric can be tightly rolled in a calender, forming a calendered web of woven fabric having a flattened fabric web surface.

The web of woven fabric formed from the blank preferably has a ratio of length to width of at least 2:1. It is thereby ensured that the preferably calendered and wound webs of woven fabric do not kink during pressing, thereby preventing the occurrence of faults or tears.

The web of woven fabric is preferably wound in the longitudinal direction of the blank and the roll of the multi-layered woven metal fabric which is thus formed is pressed substantially perpendicularly to the longitudinal direction of the blank. In this way, the stability of shape of the filter which is thus obtained can be further improved. The length of the blank is preferably selected such that the roll of the multi-layered woven metal fabric, after the winding of the web of woven fabric, only has substantially whole-numbered windings and an overlapping of the fabric layers is avoided. The beginning and end of the fabric blank preferably lie here within a sector of the roll with a mid-point angle of between 5 and 30°, In this way, after pressing, a filter with a uniform peripheral thickness can be obtained. The number of windings is preferably greater than five. If eccentric filter shapes are desired, partial windings can also be systematically provided, however, having a predetermined overlapping of the fabric layers.

After pressing, the filter preferably has a volume which is approximately 50% or more of the volume of the roll of the multi-layered woven metal fabric. The volume reduction ranges particularly preferably between approximately 20 and 30%, i.e. the pressed woven metal fabric takes up approximately 70 to 80% of the volume of the roll of the multi-layered woven metal fabric. By selecting the pressure force which is applied for pressing, the rigidity of the filter and hence the dimensional stability can be set systematically. Depending on the wire diameter and the mesh width of the initial woven fabric, different volume reductions can be achieved.

The roll of the multi-layered woven metal fabric is preferably pressed with a constant pressing force, so that a hollow cylindrical filter is provided, having a uniform consolidation. Depending on the filter's requirements for gas permeability, the pressing density may, however, also vary locally over the cross-section of the filter. Thus, the pressing density may for example be higher radially outwards than radially inwards of the metal fabric roll, so that a filter is obtained which is approximately in the shape of a hollow cone. Through the selection of a correspondingly shaped press die, in addition a beaker-shaped filter can be obtained which is closed at one end.

BRIEF DESCRIPTION OF THE DRAWINGS

Further advantages of the invention will be apparent from the following description of preferred embodiments with reference to the enclosed drawings, in which:

FIG. 7 shows the diagrammatic illustration of a blank of a woven metal fabric;

FIG. 8 shows the diagrammatic illustration of a multi-layered woven metal fabric wound to form a roll;

DETAILED DESCRIPTION OF PREFERRED EMBODIMENTS

Figure 1:
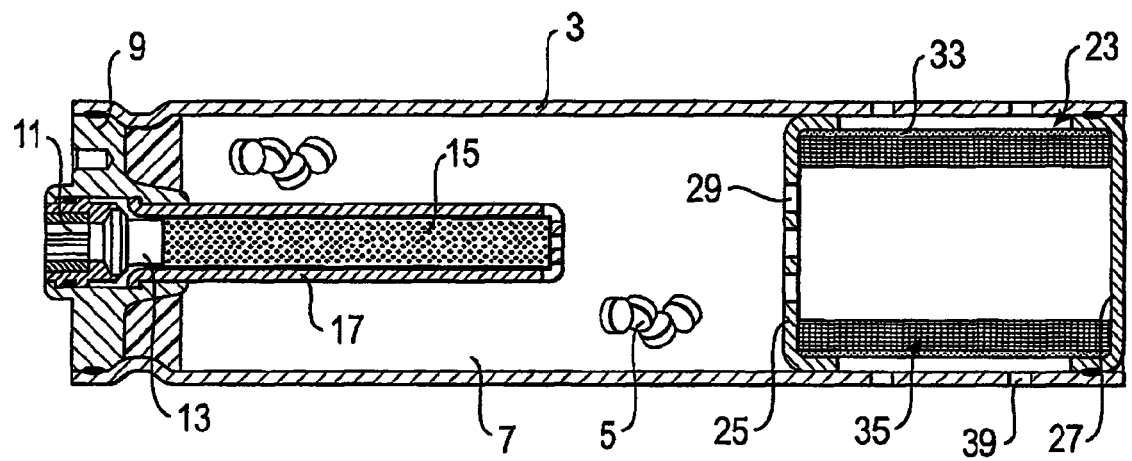
FIG. 1 shows the diagrammatic sectional view of a gas generator with a filter according to the invention.

In FIG. 1, a tubular gas generator for inflating a passenger gas bag (not shown) is illustrated by way of example. The gas generator has a tubular generator housing 3 in which a combustion chamber 7 is formed which contains propellant 5. The gas generator housing 3 is closed in a gas-tight manner on the end side by two covers. An elongated ignition unit 11, projecting into the combustion chamber 7, is provided in one of the covers 9. The ignition unit 11 comprises an igniter 13 and a booster charge 15 arranged after the igniter, said booster charge 15 being arranged in an ignition tube 17.

A filter insert 23, constructed as a pre-assembled unit, is pushed into the generator housing 3 on the end of the generator housing 3 lying opposite the cover 9. The filter insert 23 has an outer housing with two opposite end walls 25, 27 which are shaped in the form of a cup. The inner end wall 25 delimits the combustion chamber 7. Passage openings 29 in the end wall 25 allow the passage of gas which is generated from the propellant 5. A gas-permeable support ring 33 is inserted by its axial ends into the cup-shaped end walls 25, 27, so that it connects the end walls 25, 27 with each other. A tubular filter 35 lies internally against the support ring 33. Several outlet openings 39 distributed on the periphery of the generator housing 3 in the region of the filter insert 23 guide the gas, which is generated from the propellant 5 on activation, into the gas bag via the filter 35 and the outlet openings 39.

The arrangement in the gas generator of the filter 35 according to the invention is not restricted to the embodiment shown here. For example, the filter may also be arranged in the combustion chamber 7 and lie internally against the generator housing 3. Furthermore, it is possible to accommodate the filter in a separate filter housing. In cup-shaped gas generators for the driver's side, the filter can surround the combustion chamber 7 in a ring shape. These embodiments are known in the prior art and are not to be described in further detail here.

Figure 2:
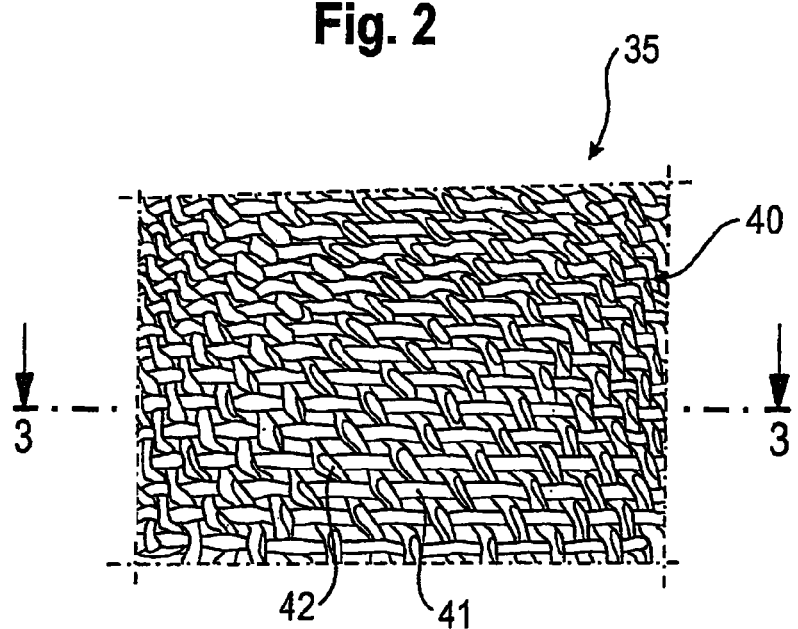
FIG. 2 shows the filter according to the invention, in a side view.
Figure 3:
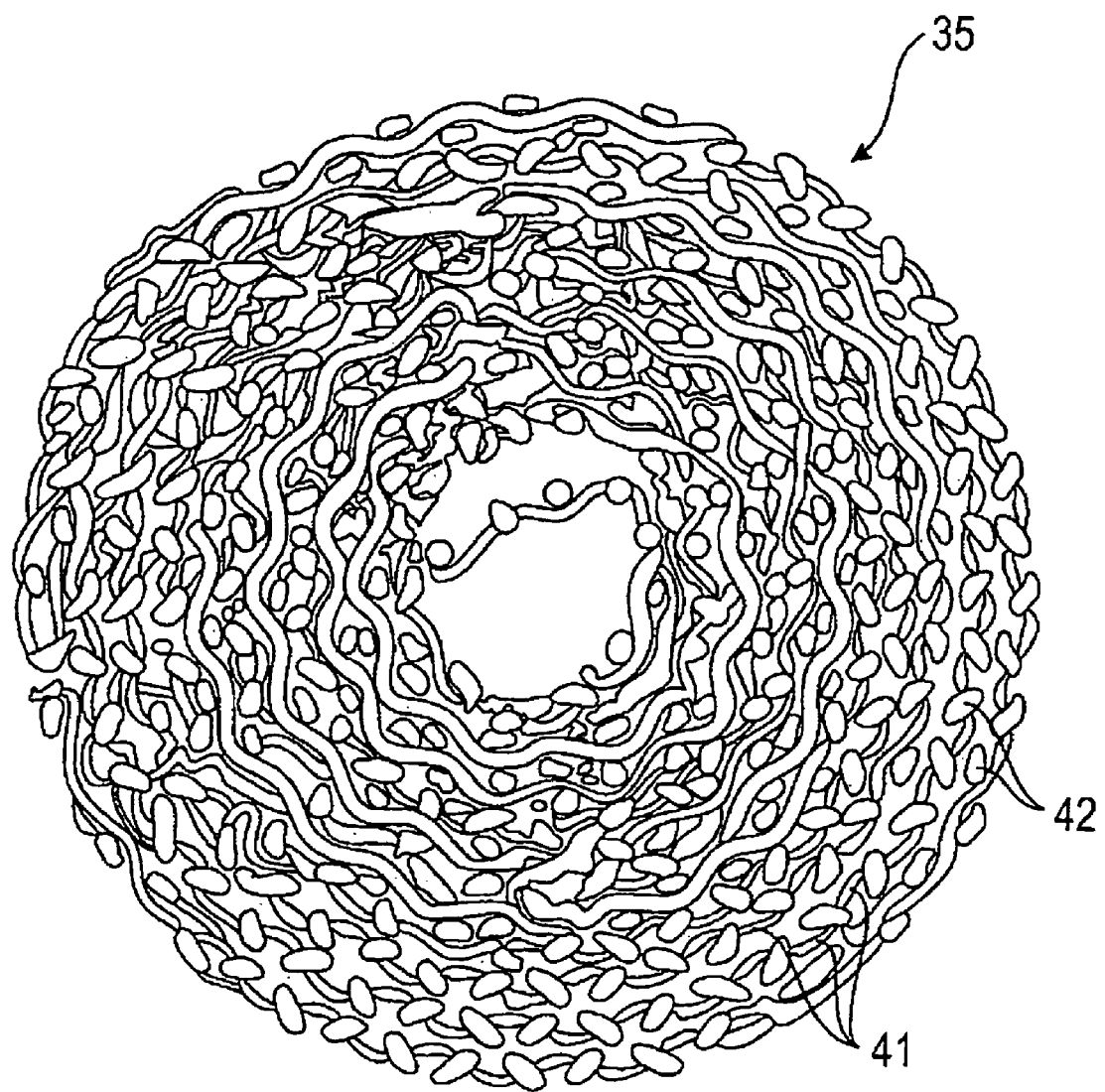
FIG. 3 shows the filter according to the invention, in a sectional view.
Figure 4:
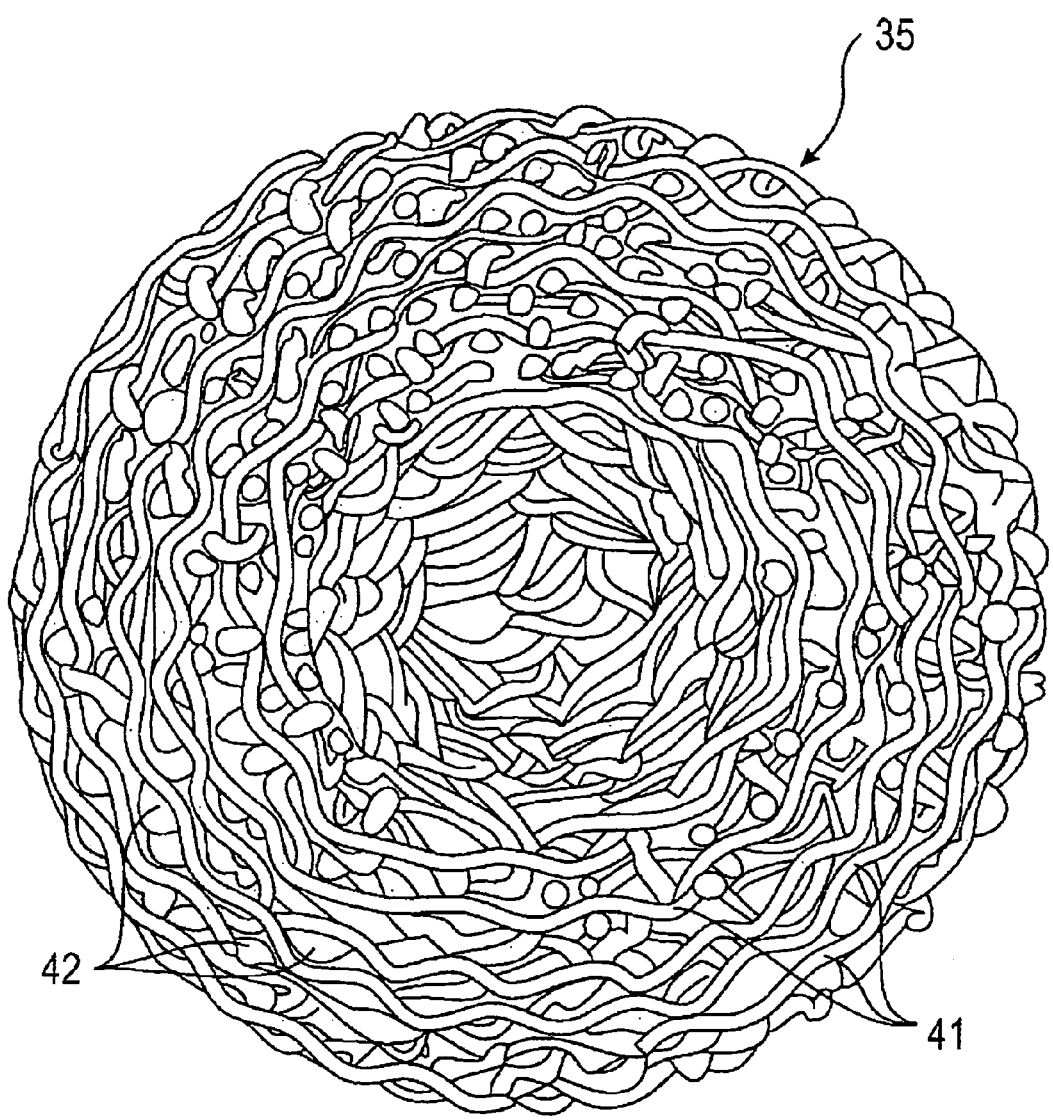
FIG. 4 shows the filter according to the invention, in an underside view.

FIGS. 2 to 4 show the filter 35 according to the invention, which is formed from several layers of a woven metal fabric 40 which consists of metal wires 41, 42 which are woven together. The woven metal fabric 40 is preferably calendered or rolled tight, in order to restrict the relative movement of the metal wires with respect to each other, and is wound to form a roll and is then pressed. Typically, the metal wires 41, 42 have a wire diameter of approximately 0.4 mm to 1.5 mm. The mesh width of the woven metal fabric amounts to approximately 0.8 mm to 4 mm. Advantageously, the mesh width corresponds to approximately twice the wire diameter.

In the embodiment shown in FIG. 2, the woven metal fabric 40 has a simple basket weave. However, other types of weave can also be used, such as for example a panama weave as a special form of basket weave, or one of the twill weaves.

The calendering of the woven metal fabric leads to a flattening of the metal wires at the respective kinks of the wires at which the warp and weft threads or wires of the woven fabric intersect. This flattening of the web surface causes the individual fabric layers to move towards each other easier and therefore causes a more dense packing to be able to be produced upon pressing. The flattening of the metal wires can be seen in particular in the view according to FIG. 2. The structure of the filter from several fabric layers can be seen both from the sectional view in FIG. 3 and also from the top view onto the underside of the filter 35 of FIG. 4. In these FIGS. 3 and 4, the wires 41, which run substantially horizontally, i.e. in the paper plane, can be associated respectively to a fabric layer. It can also be seen that through the pressing, the distance of the wires 42, running in the vertical or axial direction, which are shown in the sectional view of FIG. 3 as almost transversely cut wires, in relation to the initial fabric is substantially maintained. Therefore, the mesh width and the wire diameter can also be determined in the pressed filter. The compacting of the initial fabric takes place almost exclusively by a reduction of the mesh width of the wires 41 lying transversely to the pressing direction, said wires 41 running in a spiral shape in the horizontal direction in the sectional view of FIG. 3. On pressing, the vertically running wires 42 all tilt in one direction at the height of a horizontally running wire 41. This tilting movement may, however, take place over the entire height of the filter, in the pressing direction, in various directions. Through a rotary movement initiated at the press die of the press matrix (not shown), the tilting of the vertical wires 42 can be unified over the entire height of the filter. The homogeneity of the pore volume is thereby further improved.

Figure 5:
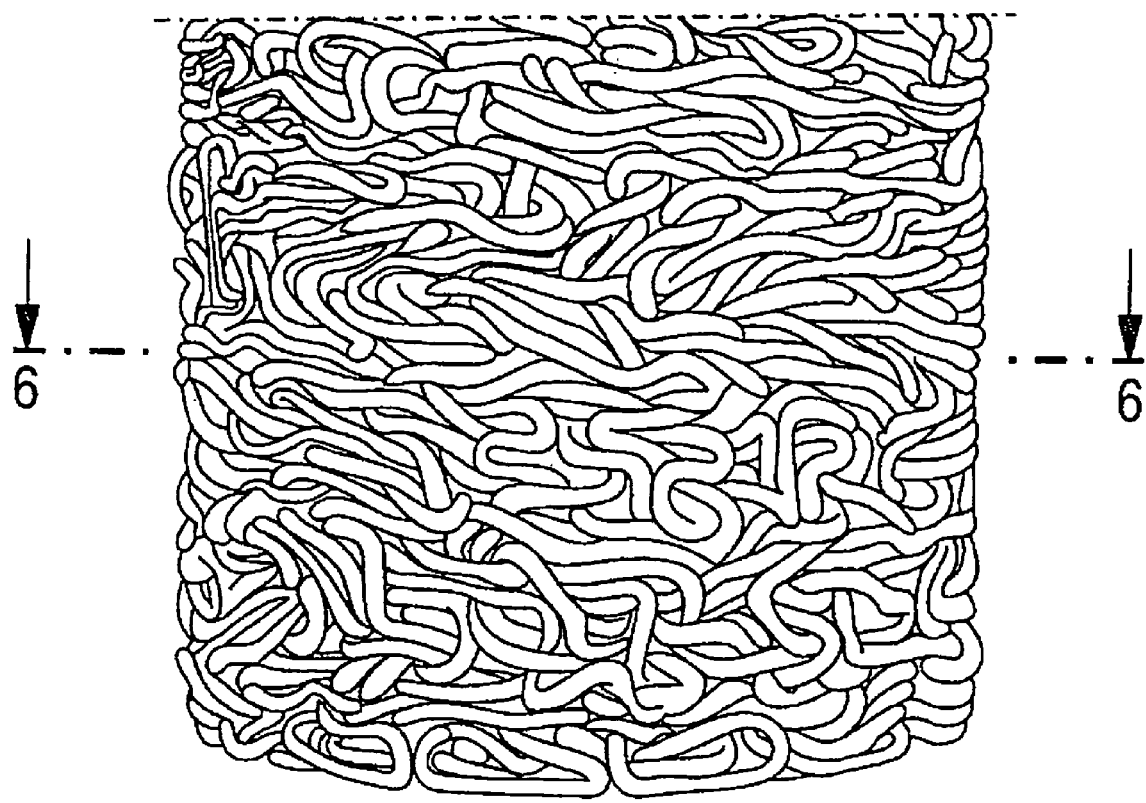
FIG. 5 shows the view of a knitted mesh filter according to the prior art.
Figure 6:
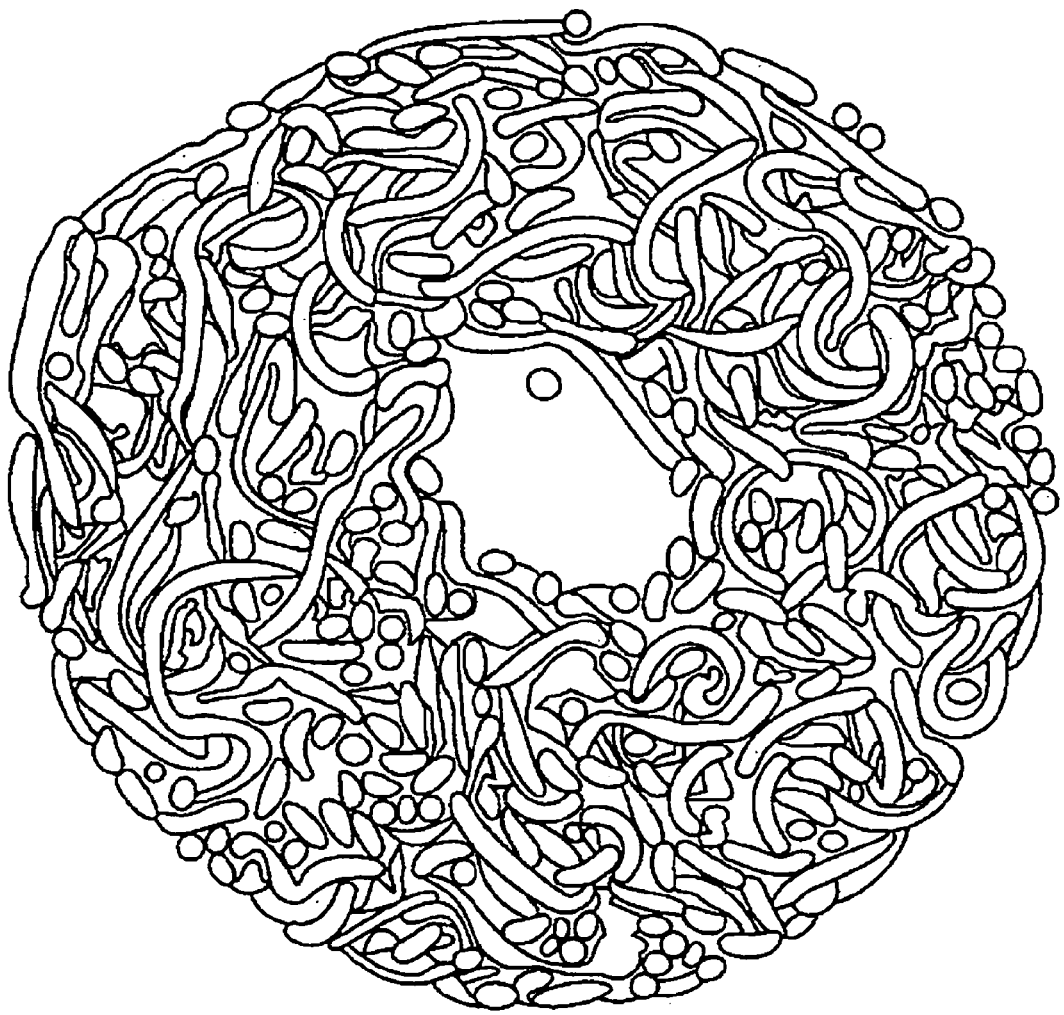
FIG. 6 shows a sectional view of the filter of FIG. 5.

By comparison, FIGS. 5 and 6 show the side view or sectional view of a conventional knitted mesh filter. In particular, the irregular arrangement of the metal wires and the largely non-homogeneous distribution of the pore volume due to the absence of a periodic structure in the pressed filter, can be seen in these illustrations. Furthermore, the illustrations show the occurrence of flaws such as the formation of gaps and large enclosed cavities which do not have fluid flowing through them and can therefore also not contribute the to filtering effect.

To produce the filter 35 according to the invention, firstly a blank of a woven metal fabric 40 is provided, as shown diagrammatically as a cut-out in FIG. 7. The woven metal fabric consists of metal threads or wires 41, 42 woven together, which in the example embodiment illustrated here are present in a basket weave. The vertical metal wires, later running in the pressing direction, are marked with reference number 42 in FIG. 7, whilst the wires running substantially horizontally in the pressed filter, i.e. perpendicularly to the pressing direction, are given reference number 41. The ratio of length l to width b of the blank is preferably greater than 2:1, so that the woven metal fabric does not kink during pressing, which helps to avoid occurring of faults.

The blank of the woven metal fabric is then rolled tightly in a calender, so that a calendered fabric web is produced. In the calendered fabric web, the metal wires 41, 42 are flattened at the intersection points of warp and weft of the fabric to produce a flattened web surface. In addition, the tight rolling fixes the position of the metal wires 41, 42 relative to each other, so that during the later pressing step, structures having as large an area as possible can be compacted within the individual fabric layers. In addition, the individual fabric layers can be moved easier towards each other and thus converted into a denser packing.

After the rolling step, the calendered fabric web is wound to a roll 43 of a multi-layered woven metal fabric (FIG. 8). The winding takes place in the longitudinal direction of the blank, i.e. in the direction of the substantially horizontally running metal wires 41, so that a substantially spiral-shaped arrangement of the fabric layers is produced, which is illustrated diagrammatically in FIG. 8. The fabric layers are designated therein by reference numbers 44, 45 and 46. The number of fabric layers shown shall serve to illustrate the invention, only, and is not to be understood to be restrictive. The length of the blank was selected so that the fabric layers 44, 45, 46, which are arranged in a spiral shape, produce a winding body with a whole-numbered number of windings, whereby an overlapping of the fabric layers at the ends of the fabric blank is avoided. The free ends of the fabric blank preferably lie here within a sector of the roll 43 with a midpoint angle α of between 5 and 30°. In this way, after the pressing step, a filter is obtained which has a uniform peripheral thickness.

Figure 9:
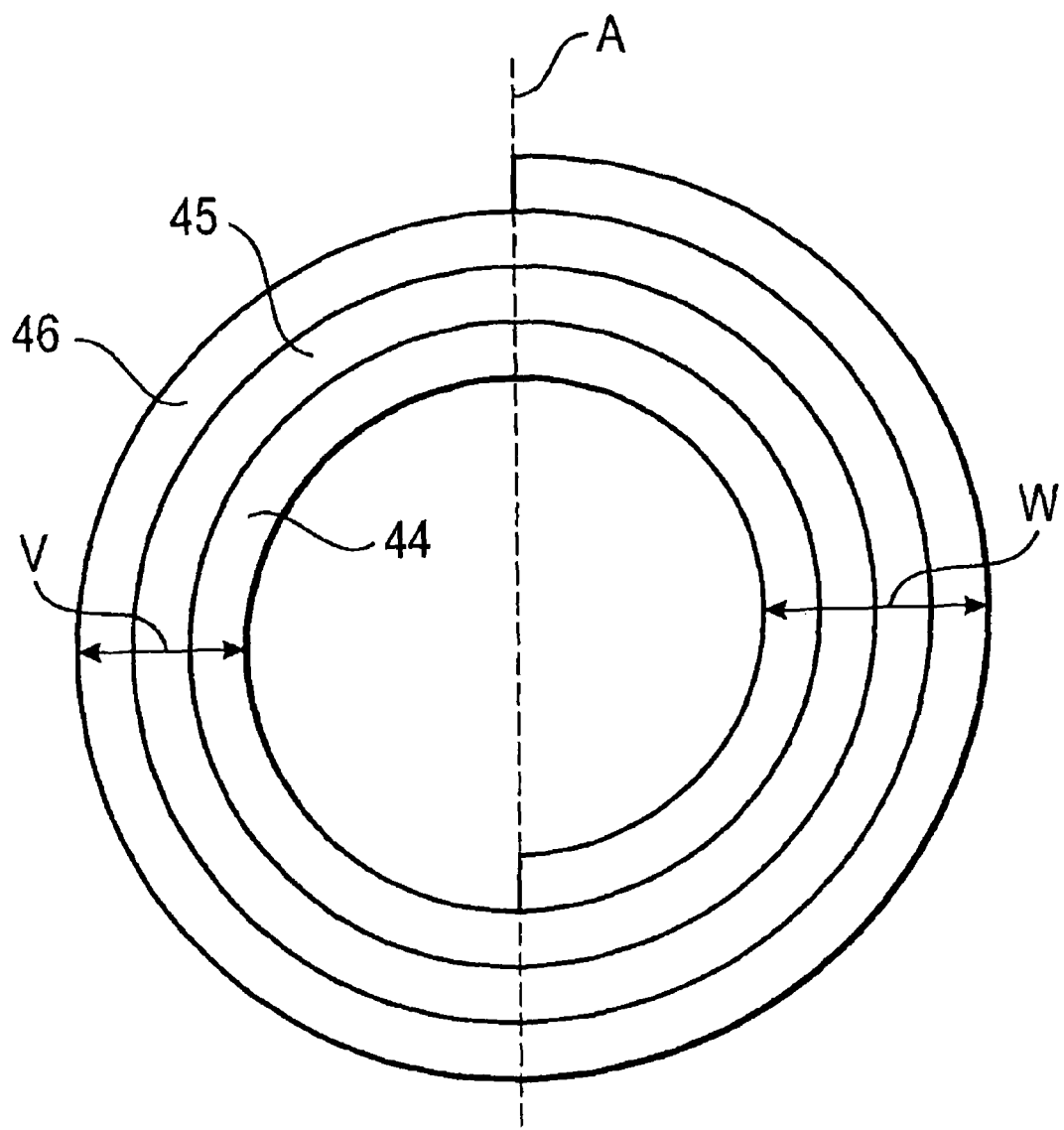
FIG. 9 shows a variant of the illustration of FIG. 8.

To produce eccentric filter shapes, however, partial windings can also be systematically provided, having a predetermined overlapping of the fabric layers 44, 45, 46. Such a variant is illustrated diagrammatically in FIG. 9. In this embodiment, the free ends of the fabric blank lie approximately opposite each other in the roll 43, so that a hollow cylindrical winding body is produced, the wall thickness V of which is smaller in one segment of the winding body than the wall thickness W in the remaining, opposite segment. The two segments of the winding body are formed here by an imaginary section along a line A, which is defined by the free ends of the fabric blank. The flow behaviour of the gas which is released from the propellant and the cooling effect of the filter can be influenced systematically by an eccentric filter obtainable from the winding body which is formed in this way.

In the next step, the roll 43 of the multi-layered woven metal fabric is pressed in a conventional press matrix, forming a hollow cylindrical filter 35. The pressing preferably takes place in the direction of the vertically running metal wires 42 of the woven metal fabric 40, so that substantially the mesh width between the horizontally running metal wires 41 is reduced. The volume reduction which is able to be achieved by pressing is up to approximately 50% of the volume of the roll of multi-layered woven metal fabric, preferably between approximately 20 and 30% and particularly preferably about 25%.

Figure 10:
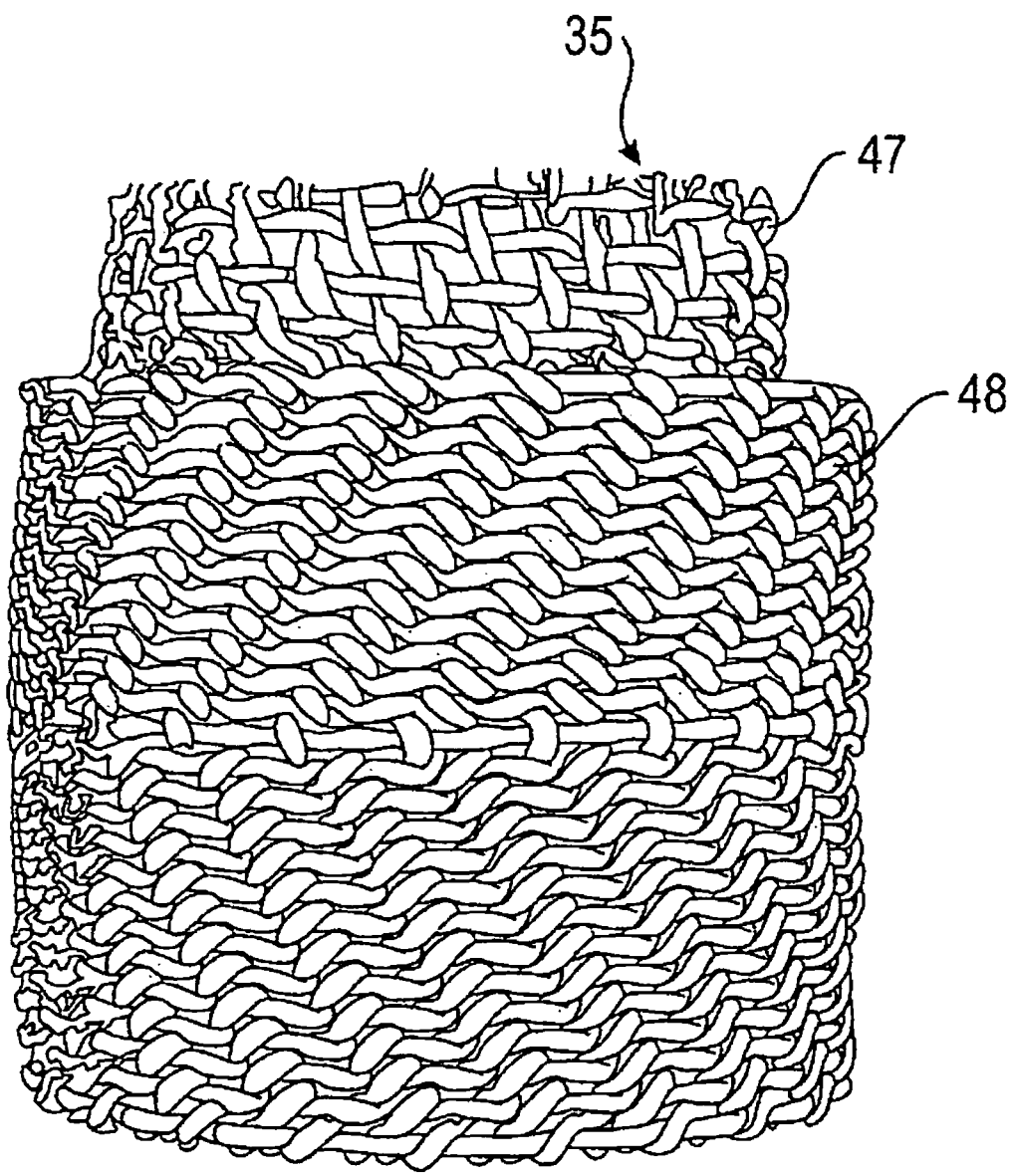
FIG. 10 shows the view of a further embodiment of the filter according to the invention.

By using press dies having different shapes, a pressing density can be set which is differently distributed locally. For example, a press die can be used with a die surface which has one or more radially inwardly receding gradations, so that the pressing density is smaller radially inwards than radially outwards, and a substantially cone-shaped filter is obtained. An example of such an embodiment is shown in FIG. 10, in which a radially internal filter section 47 has a lower compacting than the radially external section 48 of the filter. With the use of a press die, the die surface of which has an inner cone, a substantially beaker-shaped filter can be obtained, which has an end section which is shaped so as to close in.

The filtering effect of a filter produced from a calendered woven metal fabric compared with a conventional knitted mesh filter was investigated by firing tests in a standard gas generator. The mass of the examined filter was on average 38 g. The shape and volume of the filter of calendered woven metal fabric according to the invention and of the conventional knitted mesh filter were identical due to the use of identical press matrices.

The results of the investigation of the filtering effect in the standard gas generator are indicated in the following table:

|  | Filter of Knitted fabric | Filter of Woven fabric | Variation [%] |
| --- | --- | --- | --- |
| Tank wash mean value [g] | 0.53 | 0.36 | −32 |
| Particle quantity [g/m$^3$] | 0.21 | 0.09 | −57 |
| Calculated mean outlet Temperature [° C.] | 561 | 450 | −20 |
| Dirt from difference [g] | 1.33 | 0.17 | −88 |

To determine the tank wash mean value, the standard gas generator was fired in a closed canister. After the firing of the gas generator, the soluble and insoluble residues released during burning of the propellant were washed out from the canister, collected and weighed. By firing several gas generators in the closed canister and by forming the mean value, the fluctuations of the individual results are balanced out.

The measurement of the particle quantity imitates the activation of the gas generator in the vehicle. The standard gas generator was activated for this purpose in a closed measurement chamber, the volume of which corresponds approximately to the volume of the interior of a vehicle. Within a given time span after the activation of the gas generator, the air was sucked out from the measurement chamber and the particles contained in the air were collected on a fine filter. The weighing of the fine filter produced the particle quantity which represents, in relation to the unit volume, a measurement for the retaining effect of the filter in the standard gas generator. The value for the "dirt from difference" indicated in the table was determined by finding the mass balance for the standard gas generator before and after activation, in accordance with the following equation:

$$S = M_o - M_{TS} Y_{TS} - M_1$$

in which S designates the dirt from difference, $M_o$ the total mass of the gas generator before activation, $M_{TS}$ the mass of the propellant which is used, $Y_{TS}$ the propellant-specific gas yield factor and $M_1$ the mass of the gas generator after activation. Ideally, with a 100% retaining of all solid components of the converted propellant by the filter in the standard gas generator, a value of S=0 would be the result.

The results compiled in the above table show that the filter according to the invention, produced from calendered woven metal fabric, has a substantially improved filtering effect. With a uniform filtering effect, a reduction of the filter mass by approximately 30% is therefore possible. In addition to saving on material costs, the structural space required for the filter can also be reduced.

The invention claimed is:

1. A method for the production of a filter for subsequent use in a gas generator for a safety arrangement in vehicles, comprising the following steps:
   providing a flat blank of a woven metal fabric;
   winding the blank of the woven metal fabric to form a roll of a multi-layered woven metal fabric having a central longitudinal axis about which the blank is wound, the blank being wound about the central longitudinal axis such that free ends of the roll do not overlap in the roll and lie within a sector having a mid-point angle, α, of between 5 and 30° with respect to said longitudinal axis;
   pressing the roll of the multi-layered woven metal fabric in the direction of the central longitudinal axis thereby forming the filter.

2. The method according to claim 1, wherein in that the blank has a ratio of length (l) to width (b) of at least 2:1.

3. The method according to claim 1, wherein the multi-layered woven metal fabric is arranged in a spiral shape in the roll and has a substantially whole-numbered number of windings.

4. The method according to claim 1, wherein the woven metal fabric is wound in the longitudinal direction (l) of the blank and the roll of the multi-layered woven metal fabric is pressed substantially perpendicularly to the longitudinal direction (l) of the blank.

5. The method according to claim 1, wherein after said pressing step, the filter has a volume which is approximately 50% or more of the volume of the roll of the multi-layered woven metal fabric.

6. The method according to claim 1, wherein after said pressing step, the volume of the filter is between approximately 70 and 80%, preferably about 75% of the volume of the roll of the multi-layered metal fabric.

7. The method according to claim 1, wherein the step of pressing of the roll of the multi-layered woven metal fabric takes place with a pressing density which is locally differentially distributed.

8. The method according to claim 7, wherein the pressing density is greater radially outward than radially inward.

9. The method according to claim 1, wherein prior to the step of winding the blank of the woven metal fabric to a roll, the blank of said woven metal fabric is compactly rolled and calendered to form a calendered fabric web having a flattened fabric web surface.

10. A method for the production of a filter for subsequent use in a gas generator for a safety arrangement in vehicles, comprising the following steps:
    providing a flat blank of a woven metal fabric having a periodic spatial structure;
    winding the blank of the woven metal fabric to form a roll of a multi-layered woven metal fabric having a central longitudinal axis about which the blank is wound, the blank being wound about the central longitudinal axis such that a wall thickness, V, of one segment of the winding body is smaller than the thickness, W, of an opposite segment of the winding body, and such that the periodic spatial structure of the woven fabric is maintained;
    pressing the roll of the multi-layered woven metal fabric in the direction of the central longitudinal axis thereby forming the filter, the periodic spatial structure of the woven metal fabric when pressed being maintained and thereby causing the filter to have a substantially uniform pore volume.

11. An occupant restraint system comprising:
    an air bag; and
    an inflator for inflating the air bag, the inflator comprising a filter, the filter comprising:
    a flat blank of a woven metal fabric that is wound about a central longitudinal axis to form a roll of multi-layered woven metal fabric, the blank being wound about the central longitudinal axis such that free ends of the roll do not overlap in the roll and lie within a sector having a mid-point angle, α, of between 5 and 30° with respect to the longitudinal axis, the roll of multi-layered woven metal fabric being pressed prior to assembly of the inflator in the direction of the central longitudinal axis to form the filter.

12. An occupant restraint system comprising:
    an air bag; and
    an inflator for inflating the air bag, the inflator comprising a filter, the filter comprising:
    a flat blank of a woven metal fabric having a periodic spatial structure that is wound about a central longituinal axis to form a roll of multi-layered woven metal fabric, the blank being wound about the central longitudinal axis such that a wall thickness, V, of one segment of the winding body is smaller than the thickness, W, of an opposite segment of the winding body, and such that the periodic spatial structure of the woven fabric is maintained, the roll of the multi-layered woven metal fabric being pressed in the direction of the central longitudinal axis to form the filter, the periodic spatial structure of the woven metal fabric when pressed being maintained and thereby causing the filter to have a substantially uniform pore volume.

13. The method according to claim 1, wherein the flat blank of woven metal fabric has a periodic spatial structure that is maintained when wound to form the roll and when pressed to form the filter thereby causing the filter to have a substantially uniform pore volume.

14. The method according to claim 1, wherein the step of pressing the roll comprises applying a compressive force to the roll sufficient to reduce the mesh width of the woven metal fabric.

15. The method according to claim 10, wherein the step of pressing the roll comprises applying a compressive force to the roll sufficient to reduce the mesh width of the woven metal fabric.

16. An occupant restraint system comprising:
an air bag; and
an inflator for inflating the air bag, the inflator comprising a filter, the filter comprising:
a flat blank of a woven metal fabric that is wound about a central longitudinal axis to form a roll of multi-layered woven metal fabric, the blank being wound about the central longitudinal axis such that free ends of the roll do not overlap in the roll and lie within a sector having a mid-point angle, $\alpha$, of between 5 and 30° with respect to the longitudinal axis, the roll of multi-layered woven metal fabric being pressed in the direction of the central longitudinal axis to form the filter, wherein the flat blank of woven metal fabric has a periodic spatial structure that is maintained when wound to form the roll and when pressed to form the filter thereby causing the filter to have a substantially uniform pore volume.

17. The method according to claim 10, wherein the step of providing a flat blank of a woven metal fabric having a periodic spatial structure comprises the step of calendering the woven metal fabric.

18. The system according to claim 11, wherein the flat blank of woven metal fabric comprises a calendered woven metal fabric.

19. The system according to claim 12, wherein the flat blank of woven metal fabric comprises a calendered woven metal fabric.

* * * * *